10  # United States Patent Office 3,109,672
Patented Nov. 5, 1963

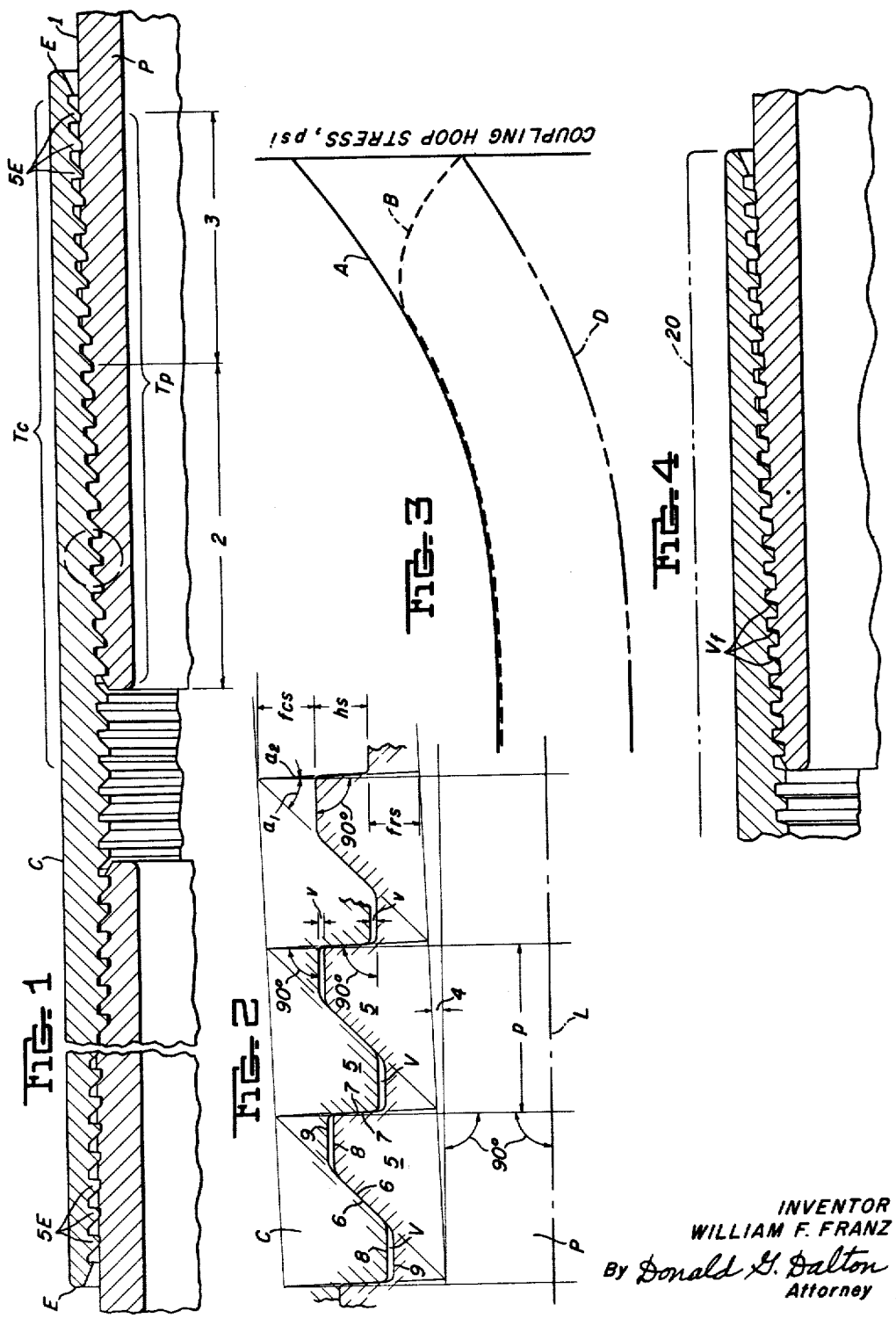

3,109,672
THREADED TUBING JOINT
William F. Franz, Greentree Borough, Pa., assignor to United States Steel Corporation, a corporation of New Jersey
Filed Feb. 15, 1960, Ser. No. 8,626
6 Claims. (Cl. 285—334)

This invention relates to threaded joints and more particularly to buttress threaded joints for oil well tubing and the like.

The several attributes of a good oil well tubing joint are good compressive strength, high joint efficiency in tension, good repeated make-up performance (since the tubing must be pulled, cleaned and re-run many times), and leak tightness at high gas pressures.

The ever-increasing quest for oil and gas has resulted in the drilling of deeper and deeper wells with corresponding increases in the pressures and tensile forces applied to the well tubing. At the same time rising drilling costs have favored multiple-completion-wells, i.e. wells using two or more tubing strings telescoped in the same well casing to permit production of oil or gas from two or more levels. Ordinarily, increased working stresses can be met by increasing the cross sectional area of the part. In the present instance, this is undesirable and the development of multiple-completion-wells has required thinning the coupling walls. This reduction in thickness can only be partially offset by making the couplings of high strength steel. The elastic ratio (ratio of yield strength to ultimate strength) for high strength steel is about 90%, as compared to a ratio of about 60% for the lower strength grade, e.g., grade J55 steel, ordinarily used. Consequently high strength couplings have limited tolerance for overstressing, and the working stresses, especially the circumferential or hoop stresses caused by power-make-up of a tubing joint, must be kept well below the yield stress to avoid disastrous failures in the field.

Further, under the new conditions of service, the level of tensile and clearance requirements has become so stringent that the conventional API tubing joint is no longer satisfactory. High tensile efficiency is achieved in a conventional casing joint, illustrated in FIGURE 4 of the attached drawings. Such joint utilizes a tapered buttress thread, the coupling thread being fully formed throughout its length, the mating thread vanishing along the cylindrical surface of the pipe. The threads are root and crest bearing, the void $V_f$ being at the flanks. Such joints have poor repeated make-up characteristics and moreover the circumferential tension or hoop stress developed in the coupling rises sharply to a maximum at the end thereof. The hoop stress level is depicted by curve A of FIGURE 3. A sharp rise in hoop stress toward the end of the coupling cannot be tolerated in a tubing joint, since in combination with stress raisers occasioned by tong marks and other unavoidable tool nicks of the repeated power-make-up operations causes unpredictable failures of the joints. This is especially critical in the case of thin tubing couplings made of high-strength steels.

Accordingly it is an object of the present invention to provide an improved threaded joint for oil well tubing free of the above limitations and characterized by a drop in the hoop stress development toward the end of the coupling during power-make-up and thus permitting the safe use of higher working stresses.

Another object of this invention is to provide a coupling of the aforementioned characteristics in which the wall thickness is no greater than that of the wall of the pipe joined thereby.

A further object is to provide an improved joint machinable in standard chaser type threading equipment.

Other objects will be apparent from the following specification when read in conjunction with the attached drawings in which:

FIGURE 1 is a longitudinal cross section of the improved threading tubing joint of my invention;

FIGURE 2 is an enlargement of the circled portion of FIGURE 1 and includes details of the thread profile;

FIGURE 3 is a graph comparing the relative level of the circumferential or hoop stress per unit area developed along the length of the coupling of the joint of the present invention and along the length of the couplings of joints of conventional design after power-make-up to the same degree; and FIGURE 4 is a longitudinal cross section of a conventional joint utilizing the conventional crest and root bearing buttress threads and is printed immediately below FIGURE 3 to facilitate the identification and comparison of the curves of the graph.

With particular reference to FIGURES 1 and 2, the letter P designates sections of oil well tubing threadedly connected by a coupling C. For deep well service, the latter are made of a suitable high strength steel, e.g. a steel having a yield strength of 80,000 p.s.i. or greater. Tubing P is provided with an external buttress thread, designated in entirety by $T_p$ and tapering at an angle 4 with respect to the longitudinal axis L of tubing P to vanish along the cylindrical outer surface 1 thereof; the coupling C with an internal complementary or mating thread $T_c$ which is fully formed over its entire length. The threaded connection between tube and coupling thus comprises a length 2 of full threads in perfect engagement followed by a runout length 3 over which the engagement gradually decreases becoming zero toward the end E of the coupling.

As more clearly shown by individual threads 5 in the enlarged view of FIGURE 2, the threads of the joint are cut to a height $h_s$, preferably equal to 0.4 of pitch $p$, to have lead-flanks 6 at flank angles $a_1$, steep following-flanks 7 at flank angles $a_2$ and flat crests 8 and roots 9, the transitions from flanks to crests and from flanks to roots being made by suitable arcs. Crests 8 and roots 9 are cut parallel to the longitudinal axis L of the tubing to facilitate stabbing. Truncations $f_{cs}$ forming crests 8 are made to exceed truncations $f_{rs}$ forming roots 9 by an amount $v$ so that mated threads 5 will bear at their flanks but clear at their crests and roots by the amount $v$ to afford the voids V.

The unique and improved properties of my joint derive from the flank bearing form of threads 5 and the critical size of the voids V. When the joint is made hand-tight, clearance $v$ exists between crests and roots throughout the length of the mating threads. Moreover, at this stage of make-up and because of the substantial lack of flanks on the tubing threads toward the end of the runout 3, end threads 5E of the coupling completely clear their mating threads. As a consequence, while the unit stresses occasioned by power-make-up develop normally over the length 2 of perfectly engaged threads, such stresses are increasingly lower than normal along the runout 3 and no stress develops in the end of the coupling until power-make-up has proceeded to the point that the amount of taper interference equals $v$. At this point, the crests of threads 5E will bear on the roots of their mating threads in the tubing and stress can develop in the end of the coupling as power-make-up is continued to bring the joint to full strength and leak tightness. The provision of crest-root voids V thus affords a stress or strain relief in the coupling C which is increasingly effective along the length of the tubing thread runout 3 as the thread flanks thereof decrease in surface area. The result is a marked decrease in the unit hoop stress developed in the end of the coupling C. The effect is illustrated by curve B of FIGURE 3. The form of curve B is characteristic of the joints of this invention. To obtain a correspondingly low stress level at the ends of the coupling of a conventional joint, would require thickening the coupling walls substantially beyond that of the pipe as indicated by the dotted line 20 of FIGURE 4. This would provide the stress level indicated by curve D of FIGURE 3.

As evident from the foregoing discussion, the degree of stress relief in coupling C is a function of crest-root clearance $v$, which must amount to at least 0.002″ and is limited by factors affecting leak tightness. To achieve leak tightness at the high internal pressures (as much as 15,000 p.s.i.) to which the joints may be subjected during use, $v$ must be limited to 0.005″ in joints for oil well service and to a maximum of 0.0035″ if the fluid to be handled is predominantly gas. However, a clearance $v$ of 0.003″ will achieve all of the objectives of my invention as shown in the following illustration.

A root-crest clearance $v$ of 0.003″ at mated individual threads amounts to a clearance of 0.006″ on diameter. The standard thread taper used in oil well joints is 1″ per 16″ of length on diameter and will cause a taper interference of 0.0078″ per turn during power-make-up. Since the standard power-make-up used is 2½ turns, the total taper interference amounts to a maximum of 0.0195″ on diameter and is taken up by compression of the tubing and expansion of the coupling. Since, as previously explained the crests of end threads of the coupling do not begin to bear on the roots of their mating threads on the tubing until the taper interference equals the value of clearance $v$ (in this case 0.003″), stresses cannot begin to build up in the coupling until the first turn of power-make-up is nearly complete. Accordingly, the 0.006″ relief on diameter afforded by a crest-root void of 0.003″ results in at least about 30% decrease in the diametrical interference developed at end of the coupling.

The tensile efficiency of the joint is determined by the size of the following-flank angle $a_2$ but varies with the yield strength of the steel used. A joint efficiency of at least 98% is required for deep well service. In joints made of high strength steel (yield 80,000 p.s.i. or greater), such minimum efficiency is provided at any angle $a_2$ between 0 and 8° and any angle within such range is considered as substantially normal to the joint axis. However, when using ordinary grades of steel (yield 55,000 p.s.i. or less), angle $a_2$ must not exceed 1°. In practice, it is preferable to limit $a_2$ to the range 0 to +1° since this affords a common thread for all grades of steel and thus permits tubing of different grades of steel to be readily interconnected.

To avoid loss of critical crest-root clearance $v$ arising from wear in the chaser dies during threading operations, lead-flank angle $a_1$ of threads 5 must be at least 30°. For example, in the case of an angle $a_1$ of 13°, each 0.001″ narrowing of the thread due to wear of the chaser will decrease the crest-root clearance $v$ by 0.0044″ whereas an angle $a_1$ of 45°, the loss in $v$ per each 0.001″ narrowing is only 0.0010″. A large angle $a_1$ also facilitates cutting of the required steep following-angle $a_2$. However, at values of $a_1$ greater than 50°, the compression strength of the joint is adversely decreased. An optimum balance of the various factors is obtained at an angle $a_1$ of 45° and use of this value is preferred.

If desired, the threads $T_c$ of the joint can be provided with a thin zinc plating of about .0002″ to .0004″ in thickness. Such zinc coatings have been applied as standard practice in API tubing joints for some time, and serve to facilitate power-make-up. Their presence have no deleterious effect in the joint of the present invention. However, I have found that a heavier tin plating on the coupling threads of about .0020″ in thickness, affords a much greater reduction in make-up torque and a number of other advantages. The filler materials, e.g. zinc dust, copper flakes, lead powder and graphite, of the regular thread compound imbed in the softer tin plating on the coupling thread flanks and form a bearing surface that has a very low coefficient of friction. This reduces the heat generated by power-make-up and lowers the make-up torque from one-third to one-half of that required with the zinc plated couplings. Although repeated make-up does not wear away the tin plating where the coupling threads mate with perfect pipe threads, the tin does wear away on the crest of the coupling threads where they engage the shallow thread grooves in the tubing thread runout. The loss of .002″ tin at this point affords in a further radial relief at the coupling end. If this relatively heavy tin plating is used, the coupling thread form must be compensated so that the thread form after plating mates correctly with threads of the tubing.

The attributes of the joint design have been particularly described with respect to tubing, but it may also be used on oil well casing and other tubular articles.

The American Standard terms and symbols as set forth in ASME Bulletin ASA B1.7–1949, entitled "Nomenclature, Definitions, and Letters Symbols for Screw Threads" have been used herein.

While I have shown and described a specific embodiment of my invention, I do not wish to be limited exactly thereto except as defined in the appended claims.

I claim:

1. A threaded pipe joint having the characteristic of maintaining leak tightness after repeated make-up, said joint comprising a pipe member having a cylindrical outer surface and a tapered buttress thread at the end thereof vanishing along said outer cylindrical surface providing a length of fully formed and a length of vanishing threads and a coupling member having a complementary thread on the internal surface thereof, said thread being fully formed throughout the length thereof and at least as long as the total length of fully formed and vanishing threads on the pipe, the complementary threads on each member having following-flanks in bearing relationship and substantially normal to the longitudinal axis of the joint leading-flanks in bearing relationship and having a larger flank-angle than said following-flanks, and crest and root truncations providing flat crests and roots which are parallel to the longitudinal axis of the joint, said crest truncations of the fully formed threads exceeding said root truncations, by an amount providing voids of predetermined amount between the crests and roots of said complementary threads throughout the length of the joint when the pipe and coupling are in hand-tight engagement, the crests of the coupling threads engaging the roots of the vanishing pipe threads after power make-up of the joint to tightness, but the voids between the crests and roots of fully formed threads remaining after said power make-up, the initial voids between the coupling threads and vanishing pipe threads preventing the development of deleterious hoop stresses at the end of the coupling during power make-up.

2. The pipe joint of claim 1 wherein the coupling member is formed of high strength steel and has a wall thickness not substantially greater than that of the pipe.

3. The pipe joint of claim 1 wherein the crest truncations of the fully formed threads exceed the root truncations by an amount providing voids of at least .002 inch.

4. The pipe joint of claim 1 wherein the crest truncations of the fully formed threads exceed the root truncations by an amount providing voids of between .002 and .005 inch.

5. The pipe joint of claim 4 wherein the leading-flanks of the complementary threads have a flank angle of between 30° and 50°.

6. The pipe joint of claim 5 wherein the following-flanks of the complementary threads have a flank-angle of 0 to +1°, the leading-flanks have a flank-angle of about 45° and the crest truncations of fully formed threads exceed the root truncations by an amount providing voids of about .003 inch.

References Cited in the file of this patent

UNITED STATES PATENTS

| | | |
|---|---|---|
| 2,056,112 | Protin | Sept. 29, 1936 |
| 2,062,407 | Eaton | Dec. 1, 1936 |
| 2,454,137 | Claypool | Nov. 16, 1948 |
| 2,505,747 | Willke | Apr. 25, 1950 |
| 2,772,102 | Webb | Nov. 27, 1956 |

FOREIGN PATENTS

| | | |
|---|---|---|
| 1,215,424 | French | Nov. 16, 1959 |

UNITED STATES PATENT OFFICE
CERTIFICATE OF CORRECTION

Patent No. 3,109,672                      November 5, 1963.

William F. Franz

It is hereby certified that error appears in the above numbered patent requiring correction and that the said Letters Patent should read as corrected below.

Column 3, line 75, after "whereas" insert -- for --; column 4, line 62, strike out "of the fully formed threads".

Signed and sealed this 21st day of April 1964.

(SEAL)
Attest:
ERNEST W. SWIDER

Attesting Officer

EDWARD J. BRENNER

Commissioner of Patents